Feb. 11, 1958     H. G. WARD     2,822,846
LEAF COMMINUTOR FOR MULCHING
Filed June 29, 1956
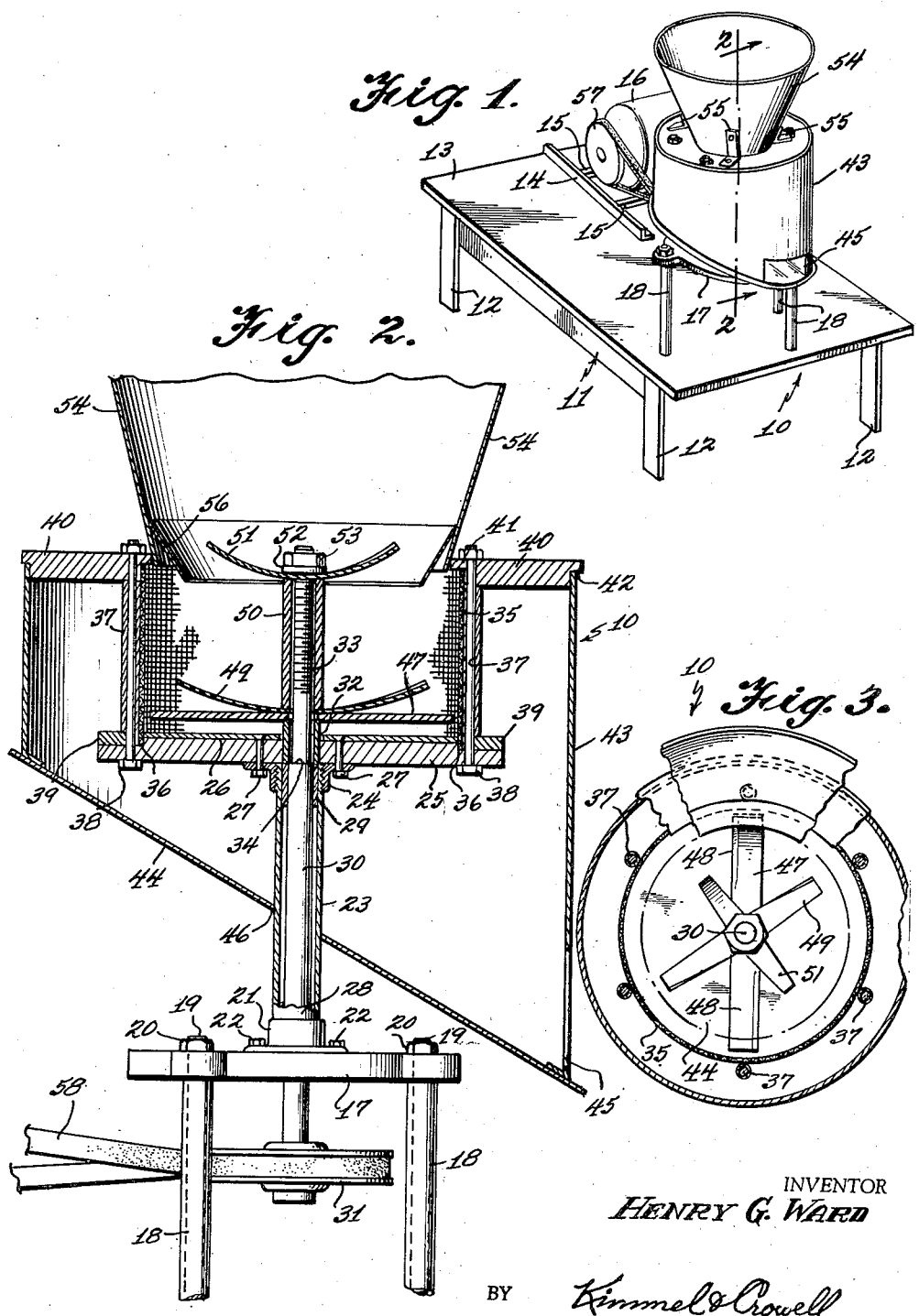
INVENTOR
*Henry G. Ward*
BY *Kimmel & Crowell*
ATTORNEYS

# United States Patent Office 2,822,846
Patented Feb. 11, 1958

2,822,846

LEAF COMMINUTOR FOR MULCHING

Henry Gohlke Ward, San Antonio, Tex.

Application June 29, 1956, Serial No. 594,823

4 Claims. (Cl. 146—192)

The present invention relates to mulching apparatus, and more particularly to a device for comminuting dried leaves, grass, weeds, and other vegetation to provide a mulch for feeding and fertilizing the soil.

The primary object of the invention is to provide a mulching apparatus in which the material to be mulched is finely divided by means of a rotating knife until it has been reduced to a size sufficient to permit it to be passed through a screen.

Another object of the invention is to provide a mulching device of the class described which can be readily disassembled to permit cleaning, repair, and transport when needed.

A further object of the invention is to provide a mulching apparatus of the class described in which the cutting blades are actuated by an electric motor associated therewith.

A still further object of the invention is to provide a mulching apparatus of the character described above which is inexpensive to manufacture, simple to operate, and which is durable in service.

Other objects and advantages will become apparent in the following specification when considered in the light of the attached drawings, in which:

Figure 1 is a perspective view of the invention.

Figure 2 is an enlarged fragmentary vertical cross-section taken substantially along the line 2—2 of Figure 1, looking in the direction of the arrows.

Figure 3 is a fragmentary top plan view of the invention with the hopper and cover shown almost completely broken away for convenience of illustration.

Referring now to the drawings in detail wherein like reference characters indicate like parts throughout the several figures, the reference numeral 10 indicates generally my new and improved mulching apparatus constructed in accordance with the invention.

The mulching apparatus 10 is provided with a base, generally indicated at 11, including a plurality of legs 12 and a horizontal top 13. The base 11 is generally rectangular in form and is provided with motor support members 14 and 15 upon which a motor 16 is adjustably mounted by any suitable means.

A support plate 17 is mounted in vertically spaced relation above the table 13 on a plurality of tubular standards 18 and is secured thereon by means of bolts 19 which extend through the plate 17, the tubular standards 18, and the table 13. The bolts 19 are each provided with a nut 20 to secure them in position.

A pipe flange 21 is secured to the upper surface of the plate 17 by means of bolts 22. A tubular standard 23 is detachably mounted in the flange 21 and projects upwardly therefrom. A pipe flange 24 is detachably secured to the upper end of the tubular standard 23 and has mounted thereon a generally flat disc 25. A metal disc 26 is positioned against the upper surface of the flat disc 25 to serve as a wear surface. Bolts 27 extend through the disc 26, the disc 25, and the flange 27 to secure the disc 25 to the flange 24.

Bearings 28 and 29 are positioned within the tubular standard 23 at opposite ends thereof and journal for rotary movement therein a shaft 30. The shaft 30 extends substantially below the plate 17 and has a pulley 31 secured to the lower end thereof. A bushing 32 surrounds the shaft 30 above the flange 24 engaging in the plate 25 and the plate 26 and extending above the plate 26 a substantial amount to serve as a spacer.

The shaft 30 has a reduced upper end portion 33 projecting above the bearing 29, as best seen in Figure 2. The reduced portion 33 forms at the juncture therewith with the major portion of the shaft 30 a shoulder 34 which engages against the spacing bushing 32 to prevent the shaft 30 from moving upwardly with relation to the standard 23.

A cylindrical screen 35 has its lower end engaged in an annular recess 36 formed in the upper surface of the plate 25 and is provided with a plurality of tubular securing members 37 secured to the screen 35 by means of welding or the like. A plurality of bolts 38 extend upwardly through the plate 25 and through the tubular connector members 37.

An annular ring 39 is positioned in surrounding relation to the bottom edge of the cylindrical screen 35 and fill the recess 36 to serve as a support for the screen 35. An annular ring 40 is provided with an inner annular recess 41 and an outer annular recess 42, as best seen in Figure 2. The annular ring 40 is supported by the tubular connector members 37 and is positioned with the recess 41 in engagement with the top edge of the screen 35, as best seen in Figure 2.

A cylindrical housing 43 is secured to the annular ring 40 along the outer edge thereof with the upper edge of the cylindrical housing 43 engaging in the annular recess 42. The cylindrical housing 43 is provided with a bottom wall 44 which extends thereacross at a substantial angle to the horizontal sloping toward an opening 45 in the bottom edge of the cylindrical housing 43 so that material falling on the bottom wall 44 will flow outwardly through the opening 45.

The tubular standard 23 passes upwardly through an opening 46 in the sloped bottom wall 44.

A horizontal cutter blade 47 is positioned in engagement with the top of the bushing 32 with the reduced portion 33 of the shaft 30 extending axially therethrough. The cutter blade 47 is generally flat and provided with sharpened cutting edges 48 at the opposite ends thereof on opposite sides thereof. An arcuate cutting blade 49 is secured on the reduced portion 33 of the shaft 30 in contact with the cutter blade 47, as best seen in Figure 2.

The arcuate cutter blade 49 has the ends thereof canted to form propeller or fan like members which assist in drawing material into the cutter blade 47. An elongated tubular spacer 50 is positioned in engagement with the top of the arcuate cutter blade 49 in encompassing relation to the reduced portion 33 of the shaft 30, as shown in Figure 2.

An arcuate cutter blade 51 is positioned over the reduced portion 33 of the shaft 30 in contact with the upper end of the tubular spacer 50 and is secured thereon by means of a washer 52 and a nut 53 threaded onto the reduced end portion 33 of the shaft 30. The arcuate cutter blade 51 is canted similarly to the cutter blade 49 to also act as a propeller or fan for the movement of material through the mulching apparatus.

A hopper 54 is positioned within the annulus of the annular ring 40 and extends upwardly therefrom. Brackets 55 support the hopper 54 on the ring 40, as best seen in Figure 1. An internal reduced skirt 56 depends from the lower portion of the hopper 54 at a point spaced above its bottom edge and projects inwardly and downwardly into the confines of the housing 43.

The motor 16 is provided with a pulley wheel 57 and a belt 58 is trained over the pulley wheel 57 and about the pulley wheel 31 so that the shaft 30 can be rotated by means of the electric motor 16.

In the use and operation of the invention, leaves or other dried material are placed in the hopper 54 and feed automatically downwardly toward the plate 25 within the housing 43. The cutter blades 47, 49 and 51 are rotated along with the shaft 30 by the motor 16 at a relatively high speed with the sharpened edges thereof producing a chopping action to reduce the dried leaf material to a mulch consistency with a size sufficiently small to pass through the apertures in the screen 35. As the finely chopped material passes through the screen 35, additional material automatically feeds downwardly from the hopper 54 until the supply is exhausted.

Material that is too large to pass through the apertures in the screen 35 stays within the confines of the screen 35 in contact with the cutting blades 49 and 47 until it has been chopped a sufficient number of times to reduce it to the mulch like size which will pass through the apertures in the screen 35.

Material passing through the screen 35 will fall onto the sloped bottom wall 44 and out through the opening 45 into a suitable container (not shown) from which it is distributed to the desired points.

Having thus described the preferred embodiment of the invention, it should be understood that numerous structural modifications and adaptations may be resorted to without departing from the scope of the appended claims.

What is claimed is:

1. A mulching apparatus comprising a support plate, a tubular standard, means securing said standard to said support plate in upright relation thereon, a flat disc, means securing said flat disc to said standard in vertically spaced parallel relation to said support plate, said flat disc having an annular recess formed in the upper surface thereof extending to the peripheral edge thereof, a cylindrical screen supported on said flat disc and having the lower end thereof engaged in said annular recess, an annular ring, said ring having inner and outer annular recesses formed in the lower surface thereof, said ring having the upper end of said cylindrical screen engaged in said inner annular recess, means securing said annular ring to said flat disc clamping said screen therebetween, a cylindrical housing having the upper end thereof engaged in said outer annular recess and secured in depending relation therein with said housing arranged in concentric substantially spaced relation to said screen, a bottom wall arranged in horizontally sloping relation on the bottom of said housing, said housing having an exit opening formed therein adjacent the lowest portion thereof, a shaft journalled in said tubular standard, cutter blades secured to said shaft within said screen, a pulley secured to the lower end of said shaft below said support plate, and means connected with said pulley for rotating said shaft and said blades.

2. A device as claimed in claim 1 wherein the means clamping said screen between said disc and said annular ring includes a plurality of tubular members secured in upright relation to said screen, and a plurality of bolts extending through said disc, said tubular members and said annular ring.

3. A device as claimed in claim 1 wherein a retainer ring is positioned in the annular recess in said disc encompassing the lower end of said screen.

4. A device as claimed in claim 1 wherein a semiconical hopper is supported by said annular ring centrally thereof for feeding material downwardly into the confines of said screen.

References Cited in the file of this patent

UNITED STATES PATENTS

| | | |
|---|---|---|
| 2,208,654 | Widuch | July 23, 1940 |
| 2,240,213 | Fromm | Apr. 29, 1941 |
| 2,637,359 | Taylor | May 5, 1953 |